Sept. 26, 1950    L. A. PAINE    2,523,514
COMBINED ADJUSTMENT AND TEMPERATURE COMPENSATOR
Filed Dec. 2, 1946
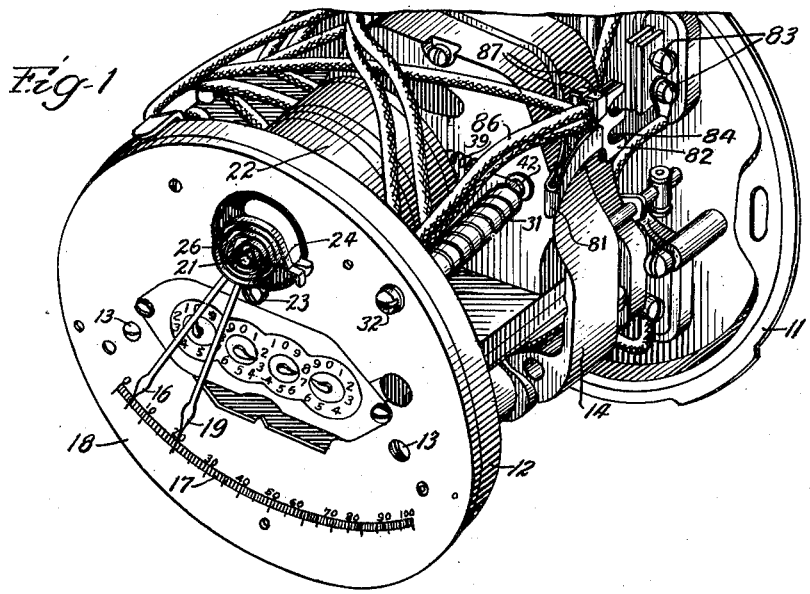
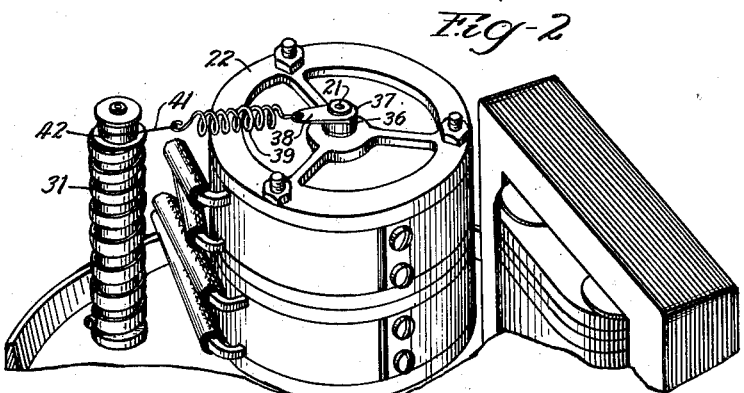
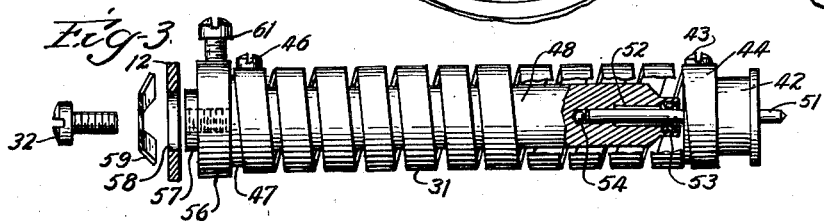
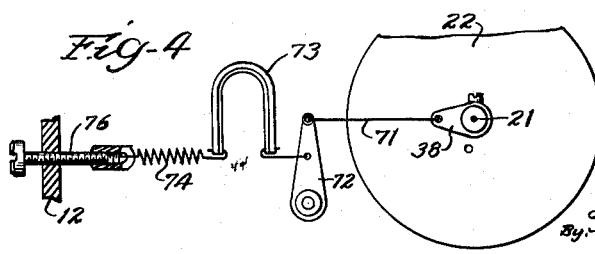
Inventor
Louis A. Paine
By: Louis Robertson Atty.

Patented Sept. 26, 1950

2,523,514

UNITED STATES PATENT OFFICE 2,523,514

COMBINED ADJUSTMENT AND TEMPERATURE COMPENSATOR

Louis A. Paine, West Lafayette, Ind., assignor to Duncan Electric Manufacturing Company, La Fayette, Ind., a corporation of Illinois Application December 2, 1946, Serial No. 713,441

8 Claims. (Cl. 116—114)

In thermal meters it is often desired to provide both temperature compensation and calibrating adjustment without disturbing the zero position of the pointer. For example, in thermal meters for indicating the demand for power in an electric circuit, there may be a pair of opposed, heat-responsive elements, such as bimetallic coils, which are connected to the pointed shaft and are independently heated in such a manner that the swing of the pointer shaft from the zero position is correlated to the watts being consumed in the circuit being measured. Usually the indicator pointer is adjustable with respect to the shaft for shifting it to the zero position on the scale when there is no power consumption. The most convenient manner of making a calibrating adjustment so as to obtain accurate readings at other parts of the scale is to make an adjustment in the spring tension which biases the pointer toward the zero position. Of course, the biasing effect must gradually decrease from a maximum at the full-load position to zero at the zero position on the scale. The adjustment of the biasing tension should change the tension at full load but should not change the position at which the pointer comes to rest at zero load, which is the pointer's zero position.

The calibrating adjustment is made manually, for example, by placing a known load on the meter for enough time for the meter to become stabilized, and turning an adjustment screw to adjust the biasing tension until the pointer points to the known value.

It is also necessary that this same biasing tension be varied automatically with changes in temperature if accuracy over a wide range of temperature conditions is required.

In meters manufactured heretofore, the foregoing requirements have been approached by a construction in which a temperature-compensating, bimetallic coil shifted a pulley along an arc lying approximately on a line through which tension should be applied to the pointer shaft to bias it toward the zero position on the scale. A flexible tensioning member has been drawn around this pulley and wound on a small drum or spool which was manually adjustable to allow more or less length in the tensioning strand, there being a spring connected in the strand between the drum and the indicator shaft. This has been rather a complicated construction and has been subject to a fault which has become increasingly important as the standards of accuracy have increased. This fault is that the pulley, because it follows an arcuate path about the axis of the coiled bimetal of the temperature compensator, could not stay in a constant position at a predetermined angle from the indicator shaft to draw the indicator to the zero position of the scale.

According to the present invention, the structure is simplified, and variations of the zero position are completely avoided by leading the tensioning strand directly to a drum which is connected to one end of a coiled bimetal strip, the other end of which is turned for the manual calibrating adjustment. Thus, both adjustments are applied directly to the same drum so that the drum can maintain a constant axial position, with the result that it always applies the biasing force to the indicator shaft from the same angle. In other words, it always draws the indicator shaft toward exactly the same zero position.

Although the invention is described with reference to a thermal demand meter, it is evident that it could be used in other types of meters, particularly those where the biasing force should reduce to zero at the zero point and where the strength of the biasing force for other parts of the scale should be adjustable for calibration and automatically varied or corrected for temperature variations.

Additional objects and advantages of the invention will be apparent from the following description and from the drawings in which:

Figure 1 is a perspective view of a meter embodying this invention;

Fig. 2 is a fragmentary perspective view showing the rear of the thermal unit seen in Fig. 1;

Fig. 3 is an exploded view partly in section showing the bimetallic spring and associated parts forming an important part of the present invention; and Fig. 4 is a diagrammatic view of a modified form of the invention.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

The invention is shown in conjunction with a watt-hour meter carried by a base 11 through which the connections to the meter mechanism may pass. The present invention relates more particularly to a thermal demand meter which is carried by a support plate 12 secured by screws 13 to the frame 14 of the meter mechanism. The thermal demand meter includes an indicator pointer 16 which moves adjacent to a scale 17 carried by a face plate 18 mounted on the support plate 12. There may also be a maximum demand indicator 19 which is positioned by the pointer 16 to the point of farthest advance of the pointer 16, the maximum demand indicator 19 remaining in this most advanced position until manually reset by the meter reader at the end of a billing period. Thus the maximum demand indicator 19 will indicate the greatest demand which was registered by the pointer 16 at any time during the billing period. The pointer 16 is carried rigidly by shaft 21 which is driven by the thermal unit 22 through which the shaft 21 extends. The thermal unit 22 conventionally includes a pair of oppositely-wound, bimetallic coils in independent chambers which are heated differentially with a conventional type of circuit so that the movement of the pointer 16 along the scale 17 indicates the kilowatt demand or consumption of the circuit being measured. When no current is being consumed in the circuit being measured, the thermal unit 22 gradually reaches a stable condition in which the pointer 16 should point exactly to the zero mark on the scale 17. One of the adjustments in calibrating the meter is to turn a pinion 23 provided with a screwdriver slot so as to turn a gear 24 which shifts the outer end of hair spring 26 to apply a correcting bias to the pointer 16 so as to zeroize it; in other words, so as to make it register zero accurately under the stabilized condition mentioned. The pointer 16 should be so secured to the shaft 21 that only slight zeroizing adjustment would be necessary. This rough setting may be made by loosening a set screw or some other form of locking, such as that of copending application, Serial No. 668,262, filed May 8, 1946. If preferred, some type of screw driver or micrometer adjustment could be provided between the pointer 16 and shaft 21 and no other zeroizing adjustment provided.

In addition to this zeroizing adjustment, it is necessary to make a calibrating adjustment so that the pointer 16 will read with commercial accuracy along the other parts of the scale. Furthermore, it is desirable in a meter of high quality to provide temperature compensation.

According to the present invention, the temperature compensation is provided by a bimetallic spring 31 which is manually adjusted by turning a screw 32 to provide the calibration adjustment. The structure by which these two features are jointly provided is better seen in Figs. 2 and 3. As seen in Fig. 2, the shaft 21 is provided with a hub 36 locked thereto by a suitable set screw 37. The hub 36 has a crank arm 38. A spring 39 is connected to the crank arm 38 and in turn is connected to a flexible strand 41. This strand 41 is wrapped around a drum surface 42 of a capstan or drum to which it is secured. As the drum surface 42 is rotated in the manner described below, it will increase or decrease the tension on the spring 39.

It is important to observe that the rotation of drum 42 does not change its angular position with respect to shaft 21. In other words, the spring 39 biases the crank arm 38 toward the same position regardless of the adjustment of the drum 42. This is an important feature in contributing toward the accuracy of the meter because the torque applied by spring 39 to the shaft 21 should decrease to zero at the zero position of the shaft 21, which is also the zero position for the indicator 16. In other words, speaking ideally, the crank arm 38 should be drawn to a position of alignment between the shaft 21 and the point of departure between drum surface 42 and strand 41 when the pointer 16 is adjacent the zero position on the scale 17. Another way of expressing this is to say that the direction in which the force of spring 39 is applied should lie in the same axial plane through the shaft 21 when the indicator 16 is at zero no matter what the adjustment of the drum surface 42 may be.

There has been a previous construction in which a single strand corresponding to the strand 41 herein was used for both calibrating adjustment and temperature compensation, but that construction was subject to the fault that it did not apply zeroizing tension in a constant direction from the indicator shaft.

*Temperature compensation*

One end of the temperature-compensating, bimetallic spring 31 is secured by screw 43 to the hub 44 of drum 42. The other end of the bimetallic spring 31 is secured by a screw 46 to a hub 47 of a post 48. Except for an initial calibrating adjustment, the hub 47 remains stationary. Accordingly, the flexing of spring 31 with changes in temperature tends to rotate the drum 42 to change the tension of tension spring 39. This change of tension provides the very desirable temperature compensation for the thermal demand meter.

In order for this temperature compensation to be accurate, the drum 42 must rotate very smoothly and easily so that a very slight force applied to it by the metallic spring 31 will be effective to correspondingly change the tension of spring 39. The manner of mounting drum 42 for easy rotation is seen in Fig. 3. The drum 42 may be staked to a pin 51 so as to be fast thereon. The pin 51 in turn slips into a bore 52 in post 48. A ring jewel 53 is preferably provided slightly spaced from the hub 44. At a point remote from the ring jewel 53, the pin 51 has a fairly smooth running fit with a reduced portion of the bore 52. The inner end of the pin 51 is shaped to form a smaller, flat area bearing on a ball 54.

*Manual calibration*

To calibrate the meter for accuracy along the higher part of the scale, the meter is connected to a load of known value for a long enough time to become stabilized and the post 48 is turned by screw 32 so as to turn the base of bimetallic spring 31 enough to change the tension of spring 39 until the indicator 16 points to the correct figure on the scale. The temperature compensation is not disturbed because the increased tension resulting from turning the post 48 will add to or subtract from any tension already present as a result of the thermal condition of the bimetal coil 31.

The mounting of the post 48 is seen best in Fig. 3. The post is provided with an enlarged integral base 56 and an extension 57 fitting snugly in a hole 58 in support plate 12, and preferably extending slightly beyond the support plate 12. The screw 32 is passed through a spring friction washer 59 and screwed into the post 48. It may either be screwed in all the way or only until a desired frictional resistance to the turning of post 48 is attained. When the screw 32 reaches the desired position, it is locked in this position by tightening a set screw 61 which bears on the screw 32. It is apparent that subsequent turning of screw 32 will no longer cause a screw action thereof in post 48 but will turn the post 48.

Although the characteristics of the bimetal spring will vary with the particular design of meter and hence will naturally be varied for any new meter design, it may be helpful to describe the bimetal spring which has been found satisfactory in the illustrated meter. The free length of the spring is 15", the thickness is .020", and the width, 1/8". It is coiled to a 3/8" outside diameter with a spacing between the turns of 1/32". These dimensions are appropriate for the manganese type of bimetal springs having a relatively high rate of flexing per degree change of temperature.

From the foregoing, it is seen that a very simple mechanism is provided according to which both manual calibration and temperature compensation may be provided without changing the direction of the zeroizing force with respect to the pointer shaft and using almost no parts that are not common to both purposes. The important feature of providing both adjustments without change in the zeroizing direction of the tensioning force may be provided in other ways within the scope of some aspects of the invention. For example, as illustrated schematically in Fig. 4, the crank arm 38 may be connected by a strand or link 71 to an arm 72 pivoted for very easy rotation and drawn in a biasing direction by a bimetal spring 73 and a tension spring 74, the latter of which is adjustable by screw 76. It will be observed that a distinguishing feature between this form of the invention and that illustrated in Figs. 1 to 3 is that the point of departure of strand or link 71 from the arm 72 moves through an arc in Fig. 4 whereas in the other figures, the corresponding point of departure may be regarded as stationary. In fact, it does move somewhat in the direction of pull, due to flexing of the post. This arcuate movement of the point of departure produces a change in the angularity with respect to the shaft 21. In this instance, however, that change has no adverse effect because for any angular position of the pointer on shaft 21, the point of departure, or the direction of pull on link 71 is always in the same direction. For example, whenever the pointer returns to zero, the link 71 will be in exactly the position shown no matter what the adjustment of tension may be on spring 74. In short, an important feature of the present invention is that both calibrating adjustment and temperature compensation may change the tension on the tensioning spring without causing any change in the angularity of the application of the tension to the pointer shaft.

To aid any who choose to practice this invention, it may be helpful to point out another advantageous feature in the meter illustrated in Fig. 1. This concerns the ease with which the entire thermal demand meter may be dismounted for repair, replacement, or substitution of a meter of different characteristics.

The entire thermal meter is carried by the support plate 12. The heaters in the thermal unit 22 are connected across one or more shunt members, one of which is seen at 81. Two such shunt members are provided on meters for 3-wire currents. Each end of a shunt member is silver soldered or otherwise secured to a terminal 82. The shunt member is bent to U shape, bringing the two terminals almost side by side. These terminals are each provided with a pair of rearwardly open slots so that they may be slipped under the heads of screws 83. As the support plate 12 is moved rearwardly into position, the screws 13 may then be applied to hold the support plate. The screws 83 may then be tightened, but it should be noted that an insulating separator 84 is positioned between the terminals 82 so that they are insulated from one another. Likewise, the screws are insulated from one terminal and from the meter blade member to which they clamp the assembled terminals. Thus the meter blade member is electrically connected to the inside terminal which in turn is connected to the shunt and is appropriately connected to the thermal demand unit. It is also connected by a wire 86 with the watt-hour meter current coil.

Each of the terminal plates is shaped with an integral lug 87 turned back upon itself to form a soldering loop so that the connections to the thermal demand unit will be dependably strong with only ordinary solder.

The features of the two preceding paragraphs are the subject of my Patent 2,482,793, issued September 27, 1949, and reference is also noted to my Patent 2,509,364, relating to the construction of the thermal unit 22.

I claim:

1. A meter including an indicator rotatable about an axis, means for applying a biasing force to said indicator including a connecting member connected to said indicator at a point spaced from the indicator axis, and tensioning means for pulling said connecting member, said tensioning means comprising a surface on which said connecting member is wound, said surface being so mounted that as it rotates the point of departure of the connecting member therefrom lies always in the same axial plane of the indicator axis, and means variable with temperature and variable manually for calibration for biasing said surface in a winding direction.

2. A meter including an indicator rotatable about an axis, means for applying a biasing force to said indicator including a connecting member connected to said indicator at a point spaced from the indicator axis, and tensioning means for pulling said connecting member, said tensioning means comprising a surface on which said connecting member is wound, said surface being so mounted that as it rotates the point of departure of the connecting member therefrom lies always in the same line perpendicular to the indicator axis, and means variable with temperature and variable manually for calibration for biasing said surface in a winding direction.

3. A meter including an indicator rotatable about an axis, means for applying a biasing force to said indicator including a connecting member connected to said indicator at a point spaced from the indicator axis, and tensioning means for pulling said connecting member, said tensioning means comprising a drum surface on which said connecting member is wound, said surface being so mounted that as it rotates the point of departure of the connecting member therefrom lies always in the same axial plane of the indicator axis, a bimetallic element connected at one end to said drum surface, and means for adjusting the other end of the bimetallic element to adjust the biasing force applied to the drum surface.

4. A meter including an indicator rotatable about an axis, means for applying a biasing force to said indicator including a connecting member connected to said indicator at a point spaced from the indicator axis, and tensioning means for pulling said connecting member, said tensioning means comprising a drum surface on which said connecting member is wound, said surface being so mounted that as it rotates the point of departure of the connecting member therefrom lies always in the same axial plane of the indicator axis, a thermal-responsive element connected at one end to said drum surface, and means for adjusting the other end of the thermal-responsive element to adjust the biasing force applied to the drum surface.

5. A meter including an indicator rotatable about an axis, means for applying a biasing force to said indicator including a connecting member connected to said indicator at a point spaced from the indicator axis, and tensioning means for pulling said connecting member, said tensioning means comprising a drum surface on which said connecting member is wound, said surface being so mounted that as it rotates the point of departure of the connecting member therefrom lies always in the same axial plane of the indicator axis, a bimetallic helix connected at one end to said drum surface, and means for adjusting the other end of the bimetallic helix to adjust the biasing force applied to the drum surface.

6. A meter including an indicator rotatable about an axis, means for applying a biasing force to said indicator including a connecting member connected to said indicator at a point spaced from the indicator axis, and tensioning means for pulling said connecting member, said tensioning means comprising a surface on which said connecting member is wound, a post by which said surface is rotatably carried and a bimetallic helix surrounding said post, connected at one end to the surface and adjustably mounted at the other end in association with the post.

7. A meter including an indicator rotatable about an axis, means for applying a biasing force to said indicator including a connecting member connected to said indicator at a point spaced from the indicator axis, and tensioning means for pulling said connecting member, said tensioning means comprising a surface on which said connecting member is wound, a post by which said surface is rotatably carried and a bimetallic helix surrounding said post, connected at one end to the surface and adjustably mounted at the other end to said post, and means securing the post on a supporting member pivotably about the rotative axis of said surface for manual adjustment of the tension applied to said surface by said helix.

8. A meter including an indicator rotatable about an axis, means for applying a biasing force to said indicator including a connecting member connected to said indicator at a point spaced from the indicator axis, and tensioning means for pulling said connecting member, said tensioning means comprising a surface on which said connecting member is wound, a shaft on which said surface is mounted, a jewel bearing ring for said shaft in proximity to said surface, and additional bearing means for said shaft spaced along said shaft further from the surface than said ring.

LOUIS A. PAINE.

REFERENCES CITED

The following references are of record in the file of this patent:

UNITED STATES PATENTS

| Number | Name | Date |
|---|---|---|
| 1,417,695 | Smith | May 30, 1922 |
| 1,425,665 | Lincoln | Aug. 15, 1922 |
| 2,282,257 | Smith | May 5, 1942 |